(12) United States Patent
Peebles et al.

(10) Patent No.: US 6,939,826 B2
(45) Date of Patent: Sep. 6, 2005

(54) PRODUCT AUTHENTICATION

(75) Inventors: Jan Lyle Peebles, Appleton, WI (US); Chandrakant Bhailalbhai Patel, Neenah, WI (US)

(73) Assignee: Appleton Papers, Inc., Appleton, WI (US)

( * ) Notice: Subject to any disclaimer, the term of this patent is extended or adjusted under 35 U.S.C. 154(b) by 90 days.

(21) Appl. No.: 10/180,688

(22) Filed: Jun. 25, 2002

(65) Prior Publication Data

US 2003/0236165 A1 Dec. 25, 2003

(51) Int. Cl.⁷ .................................................. B41M 5/30
(52) U.S. Cl. ..................... 503/201; 206/807; 283/95; 283/114; 503/226
(58) Field of Search .................. 283/95, 114; 206/807; 503/201, 226

(56) References Cited

U.S. PATENT DOCUMENTS

| | | | |
|---|---|---|---|
| 3,896,965 A | * 7/1975 | Cornell | 220/359.2 |
| 4,109,047 A | 8/1978 | Fredrickson | 428/307 |
| 4,197,346 A | 4/1980 | Stevens | 428/307 |
| 4,846,502 A | 7/1989 | Chang et al. | 283/57 |
| 4,873,219 A | 10/1989 | Brown et al. | 503/204 |
| 5,250,492 A | 10/1993 | Dotson et al. | 503/201 |
| 5,325,721 A | 7/1994 | Pendergrass, Jr. | 73/762 |
| 5,330,566 A | 7/1994 | Copeland | 106/21 E |
| 5,338,066 A | * 8/1994 | Gundjian | 283/67 |
| 5,395,138 A | 3/1995 | Chang | 283/95 |
| 5,401,060 A | 3/1995 | Chang et al. | 283/95 |
| 5,424,266 A | * 6/1995 | Gundjian | 503/201 |
| 5,595,955 A | 1/1997 | Chang et al. | 503/201 |
| 5,605,873 A | 2/1997 | Chang | 503/201 |
| 5,698,296 A | 12/1997 | Dotson et al. | 428/195 |
| 5,898,017 A | 4/1999 | Chang | 503/204 |
| 5,970,875 A | 10/1999 | Hoffmann et al. | 101/491 |
| 6,310,002 B1 | 10/2001 | Krzoska et al. | 503/213 |

* cited by examiner

*Primary Examiner*—B. Hamilton Hess
(74) *Attorney, Agent, or Firm*—Wilhelm Law Service; Thomas D. Wilhelm (57) ABSTRACT

Product package, comprising a data storage device, packaging material, and an authentication system. The authentication system comprises first and second coatings coated on the storage device and the packaging material. One of the coatings comprises chromogenic microcapsules capable of reacting to produce color. The other coating comprises color developer. The coatings can be bonded to each other or a composite coating can be a self-contained color former such as on the storage device. The invention further comprises methods of affirming authenticity of a data storage device. The method comprises applying to the storage device a color-reactable coating which can react with a color-producing second composition, packaging the storage device to provide a closed and sealed packaged, opening the package, and concurrent with or after opening the package, reacting the chemical compositions to produce the color as an indication of authenticity of the data storage device.

21 Claims, 1 Drawing Sheet

Fig. 1

PRODUCT AUTHENTICATION

BACKGROUND

This invention relates to the issue of ensuring that products which are sold as having originated at a particular source have in fact originated at the respective source. Manufacturers who own rights in product names are concerned that their products may be copied by unauthorized business entities, and sold as genuine, when in fact such name owners are not the actual source of a particular unit of goods, even though the goods bear their name.

The purpose of use and registration of exclusive ownership of a trade name is to build good will in the respective trade name by providing high quality goods and/or services in association with the trade name to such extent that consumers are able to make discerning purchasing decisions based on the name associated with the good at the time the purchase decision is made. Typically, name owners associate the registered name of the good with the product produced. Thus, the name is placed on e.g. the good, the package which contains the good, and/or on literature enclosed in a package containing the good.

Consumers are concerned, when they purchase a product bearing a particular trade name, that the goods being purchased have in fact originated from the owner of the particular name. Meantime, it is well known that unauthorized manufacturers are in fact producing and selling goods under registered trade names to which such producers do not have appropriate rights. Thus, the authenticity of some products and product types has become uncertain because of misuse of trade names on various types of products.

To the extent products are mis-labeled with trade name representations, deceiving the purchaser as to the actual source of the goods, or to the extent authenticity of the goods is uncertain, both manufacturers and consumers lose benefit of trade name use. Where the good is mis-labeled, the purchaser may purchase a good of lesser quality than expected. If the good is unsatisfactory, the purchaser may turn to the name owner for satisfaction while the name owner is not the actual source of the good. Even if the good is authentic, if the consumer is uncertain of the authenticity, neither the consumer nor the trade name owner reap full benefit of the use of the trade name. Accordingly, both the consumer and the trade name owner can be damaged by such misuse of the name.

When activity of unauthorized manufacture is discovered, the name owner has recourse under the law and can thus bring legal action accordingly. However, in some areas of technology, such unauthorized activity is prevalent among various unauthorized entities to the extent that conventional legal action by the manufacturer may, without more, be ineffective to control such unauthorized activity, whereby name owners need additional means to affirm to consumers the authenticity of their goods.

The issue of trade name misuse is especially prominent with respect to primary data storage devices such as CD ROM's and DVD's, as well as other data storage device products, used primarily for the purpose of storing and retrieving electronic data.

As used herein, the phrase "primary data storage device" refers to those devices wherein the functions of data recording, storage, and retrieval represent a substantial value of the device. Thus, the phrase "primary data storage device" can also refer to articles having other primary functions and wherein data storage is an adjunct of that function. Accordingly, the above phrase can refer to e.g. credit cards or debit cards having a data storage element, to identification cards having a data storage element, or to similar products which have primary functions beyond that of data recording, storage, and retrieval.

Addressing specifically data storage devices for storing electronic data, and wherein the data storage devices are of a generally planar configuration, for purposes of product source authentication, it is known to provide, as authentication indicia, an identifying coating or layer over the entirety of a major surface of the data storage device wherein the structure of the coating or layer, or indicia on the coating or layer, are costly, or technically difficult, to manufacture. Such authentication efforts rely on cost or technical difficulty to deter name misuse.

Also for product source authentication, it is known to provide various identification indicia on the packaging which contains the good. Such authentication efforts rely on restraint or lead time, regarding name misuse by potential manufacturers and distributors.

Further to product source authentication, it is known to provide seals on the packaging wherein the seals bear certain types of indicia which are costly or technically difficult to reproduce. Such authentication efforts rely on cost or technical difficulty to deter name misuse.

It is further known to use a combination of the above methods of enabling consumers to confirm authenticity of goods being offered for sale.

In spite of the above efforts at stopping distribution of unauthorized copies of goods, those who misuse names are becoming progressively more technically capable and better financed, whereby the problem persists. Accordingly, there is a need to provide, to manufacturers and distributors, additional options for enabling consumers to confirm or authenticate the sources of goods being purchased. Particularly, there is a need to provide additional such options for authenticating the sources of data storage devices which are sold with data resident thereon, and wherein the value of the goods is highly dependent on the data so stored thereon at the time of purchase.

More specifically, there is a need to provide additional such options for authenticating the sources of data storage devices which contain computer software, audio data, and video data, and combinations of the above general types of electronic data.

Accordingly, it is an object of the invention to provide novel structure and methods for authenticating primary data storage devices which are used to store and retrieve data in electronic format.

It is a more specific object to provide novel coatings on data storage devices, which coatings are activated for authentication purposes by causing the novel coatings to interact with one or more elements of the packaging with which the data storage device is purchased.

Yet another object is to provide a first coating comprising microcapsules containing chromogenic materials on either the data storage device or packaging therefore, and to provide a second developer coating on the other of the data storage device and packaging therefore.

Still another object is to provide a self-contained chromogenic coating including both color source composition and color developer, on a data storage device, or a primary data storage device, and to further provide packaging interaction with such self-contained coating so as to authenticate the data storage device.

SUMMARY

In a first family of embodiments, the invention comprehends a product package, comprising as a contained product, a primary data storage device capable of receiving and storing data in electronic format; packaging material comprising enclosure structure generally enclosing the data storage device; and an authentication system for affirming authenticity of source of the data storage device. The authentication system comprises a first coating coated on a first outer surface of the primary data storage device, and a second coating coated on a second surface of the packaging material. One of the first and second coatings comprises a population of microcapsules containing substantially colorless color forming material capable of reacting to produce visible color. The other of the first and second coatings comprises color developer material which can chemically react with the color forming material to produce visible color.

In some embodiments, the first coating comprises the color developer and the second coating comprises the microcapsules containing the color former.

In other embodiments, the second coating comprises the color developer and the first coating comprises the microcapsules containing the color former.

In some embodiments, the packaging material comprises a sheet material separate and distinct from both the enclosure structure and the data storage device and enclosed in the product package with the data storage device, one of the first and second coatings being coated onto such sheet material.

In some embodiments, the sheet material is releasably attached to the data storage device.

In other embodiments, the sheet material is attached to the enclosure structure.

In some embodiments, the first coating defines alphanumeric indicia, graphics and logos.

In some embodiments, the first coating is coated onto the enclosure structure and the second coating is coated onto the primary data storage device, and the first and second coatings are bonded to each other such that such bond therebetween is broken when the package is opened, with corresponding breaking of ones of the microcapsules and reaction of the color forming material to form color.

In preferred embodiments, the first coating is symmetric with respect to a central axis of the primary data storage device.

In some embodiments, the first coating comprises at least first and second coating elements, physically spaced from each other, and the at least first and second coating elements, in combination, are symmetric with respect to each other when referenced to a central axis of rotation of the primary data storage device.

In some embodiments, the first outer surface of the primary data storage device defines an outer edge-to-outer edge projected area of the primary data storage device, and the first coating is disposed inwardly toward a center of such projected area with respect to any portion of the primary data storage device on which data is stored.

In some embodiments, the second coating is disposed on a cover of the enclosure structure which is in face-to-face close association with the first outer surface of the primary data storage device when the package is closed with the primary data storage device inside, and the second coating is positioned on an inner surface of the cover so as to overlie the first coating on the primary data storage device when the package is closed, whereby pressure on an outer surface of the cover causes the cover to deflect so as to bring the second coating into engaging contact with the first coating sufficient to break the microcapsules and produce visible color.

In a second family of embodiments, the invention comprehends a primary data storage device capable of receiving and storing data in electronic format. The primary data storage device has an outer surface and comprises a substrate; a recording medium in association with the substrate; and a self-contained coating comprising a chromogenic coating composition, and color developer therefore, on the outer surface of the primary data storage device, the self-contained coating composition comprising substantially colorless color forming material contained in readily ruptured microcapsules and capable of reacting to produce visible color, and color developer material which can chemically react with the color forming material to produce visible color.

In some embodiments the primary data storage device is packaged in a package comprising packaging material wherein the self-contained chromogenic coating composition is disposed in close relationship with the packaging material when the package is closed such that the packaging material can be manipulated while the package is closed and sealed so as to rupture ones of the microcapsules to cause a sufficient quantity of the color forming material to react with the color developer thereby to produce visible color as an indicator of authenticity of the primary data storage device.

In some embodiments wherein the primary data storage device is packaged in a package comprising packaging material, the invention further comprises adhesive material bonding the coating composition to both the primary data storage device, and to a displaceable outer wall of the package.

In preferred such embodiments, compositions of the adhesive material and the microcapsules are cooperatively selected such that, when the displaceable outer wall of the package is displaced in opening the package, ones of the microcapsules are ruptured and the color forming material contained therein reacts with the color developer thereby to produce visible color as an indicator of authenticity of the primary data storage device.

In some embodiments, the self-contained coating defines an outline representing alphanumeric indicia, graphics and logos.

In a third family of embodiments, the invention comprehends a method of affirming authenticity of a primary electronic data storage device. The method comprises applying to an outer surface of the primary data storage device a coating comprising a first chemical composition which can be reacted with a second different chemical composition to produce a color; packaging the primary data storage device in packaging material so as to provide a closed and sealed packaged product; subsequent to packaging the primary data storage device, breaking the seal and opening the package; concurrent with or after opening the package, reacting the first chemical composition thereby to produce the color as an indication of authenticity of the data storage device.

In some embodiments wherein the coating on the outer surface of the primary data storage device comprises a first coating comprising microcapsules containing chromogenic material capable of reacting to produce a color as the first chemical composition, the method further comprises as part of the packaging material, providing a coated sheet in the closed and sealed package, the coated sheet comprising a substrate, and a second coating thereon as the second different chemical composition, the second different chemical composition comprising a color developer reactive with the chromogenic material in the first coating, and bringing the first and second coatings into activating contact with each other thereby to activate a reaction between the first and second coatings and accordingly to develop the color on the coated sheet.

The method can further comprise returning the coated sheet, with the color developed thereon, to a manufacturer's representative at an authorized authentication facility for manufacturer authentication of the primary data storage device in accord with the color so developed.

Yet further, the method can comprise authenticating the primary data storage device through comparison of the developed color on the coated sheet with a color standard.

BRIEF DESCRIPTION OF THE DRAWINGS

FIG. 1 shows a compact disc 10 disposed in a receptacle portion 12 of a jewel case 14, the jewel case being used as an enclosure structure for purposes of providing a package for the compact disc. Jewel case 14 further includes a cover 16 for completing the enclosure of the compact disc in a closed and sealed package. When closed and sealed as a package with the compact disc enclosed therein, a variety of sheet materials 18 are typically enclosed with the compact disc. Such sheet materials typically include such documents as an instruction sheet, warranty information, a registration sheet, certificate of authenticity, advertisements for related products or services, and the like.

The invention is not limited in its application to the details of construction or the arrangement of the components set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

Figure 1:
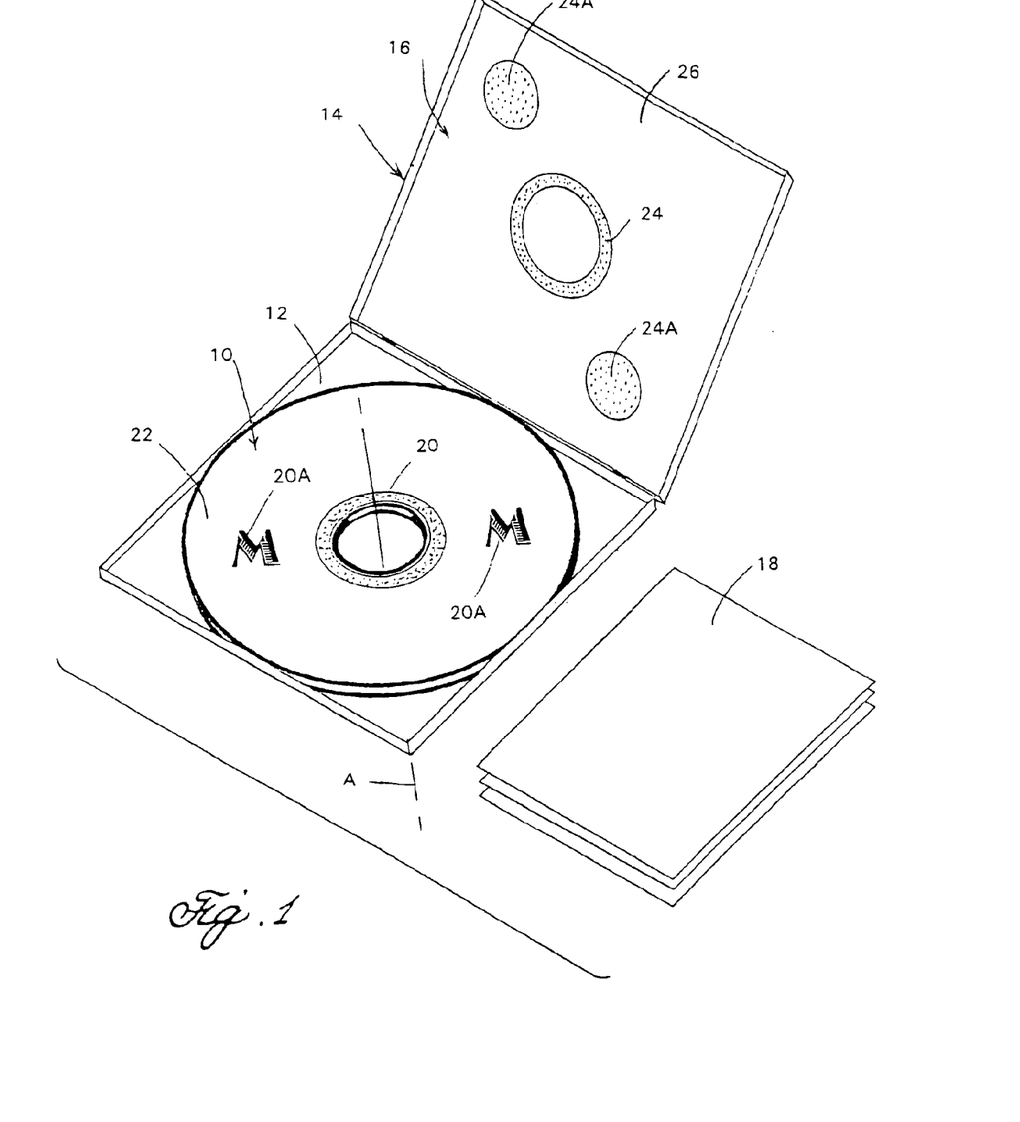

FIG. 1 shows a compact disc 10 disposed in a receptacle portion 12 of a jewel case 14, the jewel case being used as an enclosure structure for purposes of providing a package for the compact disc. Jewel case 14 further includes a cover 16 for completing the enclosure of the compact in a closed and sealed package. When closed and sealed as a package with the compact disc enclosed therein, a variety of sheet materials 18 are typically enclosed with the compact disc. Such sheet materials typically include such documents as an instruction sheet, warranty information, a registration sheet, certificate of authenticity, advertisements for related products or services, and the like.

A first coating 20 is shown as a stippled ring coated on an outer major surface 22 of compact disc 10. A second coating 24 is shown, also as a stippled ring, coated on an inner surface 26 of cover 16 of jewel case 14. Coatings 20 and 24 collectively include a generally colorless chromogenic material which can react with a second chemical to produce a visible color indication. The chromogenic material is enclosed within polymeric microcapsules which protect the chromogenic material from pre-maturely reacting to form the visible color indication. Coatings 20 and 24 collectively further comprise a color developer, ink composition, which is capable of reacting with the chromogenic material to form the color indication.

In the embodiment shown in FIG. 1, the color developer, ink composition, is included in the composition of coating 20 on the compact disc, and is generally known in the industry of carbonless chromogenic coatings as a CF coating. The chromogenic material, in the microcapsules, is included in the composition of coating 24 and is generally known in the industry of carbonless chromogenic coatings as a CB coating.

In some embodiments, the coatings can be reversed such that the CB chromogenic material-containing coating is on the compact disc and the CF color developer coating is on the inside surface of the cover of the jewel case.

A particularly desirable feature of the invention is that the two layers 20, 24 are collectively disposed, one on each of the data storage device and the other on an element of the packaging material.

As used herein, "packaging material" includes both the enclosing structure such as jewel case 14 and any other loose elements not specific to delivery of the stored data, for example literature sheets 18. Packaging material can include, for example, a wide variety of other peripheral materials such as labels, stabilizers, cushioning material, and the like.

A CB coating is generally applied by coating a substrate such as the inside surface of cover 16 of the jewel case with a color former coating which includes typically pressure or tension rupturable microcapsules containing a solution of one or more generally colorless color formers, and one or more binder materials. Typically protective stilt material such as uncooked wheat starch particles are also included. When the coated side of a CB sheet (color former layer) is placed in contact with the color developing layer of the CF coated substrate and pressure is applied, a portion of the color forming capsules is ruptured and a fraction of the color former solution released, some of which transfers to the CF coating where a reaction with a color developer results in formation of an image. Typically, using single liquid drop color former capsules such as described in, for example, U.S. Pat. Nos. 4,552,811; 4,001,140; and 4,100,103 a suitable fraction of the total available color former present in the microcapsules per unit area is transferred to the color developer coating when suitable pressure, such as a writing stylus, blunt object, or other writing instrument, is applied to the substrate, so as to develop a color image in the CF coating.

The liquid core material or solvent for the color forming chromogenic material employed in the microcapsules can be any material which is liquid within the temperature range at which the data storage device is normally used and which does not suppress or otherwise adversely affect the color-forming reaction. Examples of suitable liquids include, but are not limited to, those solvents conventionally used for carbonless copy paper, including dialkyl phthalates in which the alkyl groups thereof have from 4 to 13 carbon atoms, e.g., dibutyl phthalate, dioctylphthalate, dinonyl phthalate and ditridecyl phthalate, 2,2,4-trimethyl-1,3-pentanediol diisobutyrate (U.S. Pat. No. 4,027,065), ethyldiphenyl-methane (U.S. Pat. No. 3,996,405), alkyl biphenyls such as monoisopropylbiphenyl (U.S. Pat. No. 3,627,581), $C_{10}$–$C_{14}$ alkyl benzenes such as dodecyl benzene, diaryl ethers, di(aralkyl)ethers and aryl aralkyl ethers, ethers such as diphenyl ether, dibenzyl ether and phenyl benzyl ether, liquid higher dialkyl ethers (having at least 8 carbon atoms), liquid higher alkyl ketones (having at least 9 carbon atoms), alkyl or aralkyl benzoates, e.g., benzyl benzoate, alkylated naphthalenes such as dipropylnaphthalene (U.S. Pat. No. 3,806,463), partially hydrogenated terphenyls, vegetable oils, esters of vegetable oils, ethyldiphenylmethane (U.S.

Pat. No. 3,996,405); benzylxylene (U.S. Pat. No. 4,130, 299); alkyl biphenyls such as propylbiphenyl (U.S. Pat. No. 3,627,581) and butylbiphenyl (U.S. Pat. No. 4,287,074); dialkyl phthalates in which the alkyl groups thereof have from 4 to 13 carbon atoms, e.g. dibutyl phthalate, dioctylphthalate, dinonyl phthalate and ditridecylphthalate, 2,2,4-trimethyl-1,2-pentadiol diisobutyrate (U.S. Pat. No. 4,027,065); high boiling straight or branched chain hydrocarbons; and mixtures of the above. The solvents for the color former can include any of the above which possess sufficient solubility for the chromogenic material.

If desired, common diluents such as straight chain hydrocarbons can be blended with the solvents, or blend of solvents.

Microcapsules can be prepared by processes well known in the art such as from urea-formaldehyde resin and/or melamine-formaldehyde resin as disclosed in e.g. U.S. Pat. Nos. 4,001,140; 4,1000,103; or 4,552,811.

A CB coating can be utilized for image formation with any CF coating which contains one or more color developer materials for the color former material employed in the CB coating.

Chromogenic color former materials for use in the microcapsules of the present invention are generally electron-donating dye precursors which include phthalide, leucauramine and fluoran compounds. Examples of such chromogenic materials include Crystal Violet Lactone (3,3-bis(4-dimethylaminophenyl)-6-dimethylaminophthalide, U.S. Pat. No. RE. 23,024); phenyl-, indol-, pyrrol- and carbazol-substituted phthalides (for example, in U.S. Pat. Nos. 3,491,111; 3,491,112; 3,491,116; 3,509,174); nitro-, amino-, amido-, sulfonamido-, aminobenzylidene-, halo-, anilino-substituted fluorans (for example, in U.S. Pat. Nos. 3,624,107; 3,627,787; 3,641,011; 3,642,828; 3,681,390); spiro- dipyrans (U.S. Pat. No. 3,971,808); and pyridine and pyrazine compounds (for example, in U.S. Pat. Nos. 3,775,424 and 3,853,869). Other eligible chromogenic materials include: 3-diethylamino-6-methyl-7-anilino-fluoran (U.S. Pat. No. 3,681,390); 2-anilino-3-methyl-6-dibutylamino-fluoran (U.S. Pat. No. 4,510,513) also known as 3-dibutylamino-6-methyl-7-anilino-fluoran; 3-dibutylamino-7-(2-chloroanilino)fluoran; 3-(N-ethyl-N-tetrahydrofurfurylamino)-6-methyl-7-3-5-6-tris(dimethylamino)spiro[9H-fluorene-9(3-H)-isobenzofuran]-3-one; 7-(1-ethyl-2-methylindol-3-yl)-7-(4-diethylamino-2-ethoxyphenyl)-5,7-dihydrofuro[3,4-b]pyridin-5-one (U.S. Pat. No. 4,246,318); 3-diethylamino-7-(2-chloroanilino)fluoran (U.S. Pat. No. 3,920,510); 3-(N-methylcyclohexylamino)-6-methyl-7-anilino-fluoran (U.S. Pat. No. 3,959,571); 7-(1-octyl-2-methylindol-3-yl)-7-4-(4-diethylamino-2-ethoxy-phenyl)-5,7-dihydrofuro [3,4-b] pyridin-5-one; 3-diethylamino-7,8-benzofluoran; 3,3-bis(1-ethyl-2-methylindol-3-yl) phthalide; 3-diethylamino-7-anilino-fluoran; 3-diethylamino-7-benzylamino-fluoran; 3-phenyl-7-dibenzylamino-2,2-spiro-di-[2H-1-benzopyran]; 6-[ethyl(3-methylbutyl)amino]-3-methyl-2-(phenylamino)-spiro[isobenzofuran-1]3H), 9-[9H]xanthen[-3-one; 6-(dimethylamino-3,3-bis(4-(dimethylamino) phenyl)-1 (3H)-isobenzofuranone (crystal violet lactone); 3-diethylamino-6-methyl-7-(2,4-dimethylphenyl) aminofluoran and mixtures of any of the foregoing. The α or β crystalline forms, of some of the flourans, where such are known, are equally functional, and equivalent for purposes of this invention. Chromogenic color forming materials are available to express a wide variety of colors. Expression of multiple colors or blended colors with appropriate selection of different CB coatings is a further option available.

Unless otherwise indicated herein, all measurements, percentages, or parts are on the basis of weight.

When the color former employed in the CB coating is a chemically basic chromogenic material, any known acidic developer material can be employed in the CF coating, such as, for example and without limitation, clays; treated clays (U.S. Pat. Nos. 3,622,364 and 3,753,761); aromatic carboxylic acids and metal salts thereof (U.S. Pat. No. 4,022.936); phenolic developers (U.S. Pat. No. 3.244,550); acidic polymeric material such as phenol-formaldehyde polymers, etc. (U.S. Pat. Nos. 3,455,721 and 3,672,935); and metal-modified phenolic resins (U.S. Pat. Nos. 3,732,120; 3,737, 410; 4,165,102; 4,165,103; 4,166,644; and 4,188,456).

Optionally, in a yet further embodiment, capsule sets can be included in both coating 20 and 24 however each set of capsules expressing a separate different color. When the surfaces with coatings 20 and 24 are brought together a third color can be expressed. Developer could be included with either coating 20 or 24.

The color developer material in CF coating 20 however typically would not include the microcapsules of chromogenic material, and comprises generally an ink base composition devoid of a color forming composition, but containing, instead, the color-developing coreactant, which is reactive with the chromogenic material of the opposing CB coating. When the microcapsules of the opposing coating 24 break, releasing the contained chromogenic material onto the color developer in CF ink coating 20, the color-forming reaction takes place thus to develop the desired color image.

Thus, the composition of coating 20 can be selected from a wide range of known inks wherein coreactant material is used, in an ink base, in place of typical colorant materials, and wherein the coreactant is reactive with the chromogenic material in the microcapsules of coating 24. Listed below are typical illustrations of lithographic ink bases and UV curable ink bases which are useful in the CF coating.

TABLE 1

| TYPICAL CF LITHOGRAPHIC INK | | |
|---|---|---|
| Material | Typical Amount | Range |
| Coreactant Ink Base | 30% | 10% to 40% |
| Solvent | 25% | 10% to 40% |
| Resin | 40% | 9% to 60% |
| Additives | 5% | 1% to 10% |
| Total | 100% | |

Types of Coreactants

The coreactant, also known as the color developer, can be an inorganic color developer. Such color developers can be, for example, inorganic acid minerals such as montmorillonite clay, as disclosed in British Patent No. 1213835; colloidal silica, kaolin, bentonite, attapulgite, silton clay, hallosyte, and the like. The acid mineral materials are preferred as they do not melt but undergo color reaction on reaction of the chromogenic material. Alternatively, or in addition, other acid clays may be used, as can so-called semi-synthetic inorganic developers as disclosed for example, in European Patent Applications Nos. 44645 and 144472A, or alumina/silica colour developers such as disclosed in European Patent Applications Nos. 42265A, 42266A, 434306A, or 518471A.

Other acidic developer materials include the compounds listed in U.S. Pat. No. 3,539,375 as phenolic reactive material, such as monophenols and diphenols. Acidic developer materials also include, the following compounds which can be used individually or in mixtures: 4,4-isopropylidinediphenol (Bisphenol A); p-hydroxybenzaldehyde; p-hydroxybenzophenone; p-hydroxypropiophenone; 2,4-dihydroxyacetophenone; 4-hydroxy-4-methylbenzophenone; 4,4-dihydroxybenzophenone; 2,2-bis(4-hydroxyphenyl)-4-methylpentane; benzyl 4-hydroxyphenyl ketone; 2,2-bis(4-hydroxyphenyl)-5-methyl-hexane; ethyl-4-,4-bis(4-hydroxyphenyl)-pentanoate; isopropyl-4,4-bis(4-hydroxyphenyl) pentanoate; methyl-4,4-bis (4-hydroxyphenyl) pentanoate; allyl-4,4-bis (4-pentane; 4,4-bis(4-hydroxyphenyl)-heptane; 2,2-bis (4-hydroxyphenyl)-1-phenylpropane; 2,2-bis (4-hydroxyphenyl) butane; 2,2-methylene-bis(4-ethyl-6-tertiarybutyl phenol); 4-hydroxycoumarin; 7-hydroxy-4-methyl-coumarin; 2,2-methene-bis (4-octyl phenol); 4,4-sulfonyldiphenol; 4,4-thiobis (6-tertiarybutyl-m-cresol); methyl-p-hydroxybenzoate; n-propyl-p-hydroxybenzoate; benzyl-p-hydroxybenzoate; 4,4-isopropylin-dinediphenol, n-propyl-4,4-bis (4-hydroxyphenyl) pentanoate, isopropyl-4,4-bis(4-hydroxyphenyl) pentanoate, methyl 4,4-bis (4-hydroxyphenyl) pentanoate, 2,2-bis(4-hydroxyphenyl)-4-4-methylpentane, p-hydroxybenzophenone, 2,4-dihydroxybenzophenone, 1,1-bis(4-hydroxyphenyl) cyclohexane, and benzyl-p-hydroxybenzoate. Acidic developer material can also include phenolic novolak resins which are the product of reaction between, for example, formaldehyde and a phenol such as an alkylphenol, e.g., p-octylphenol, or other phenols such as p-phenylphenol, and the like. Examples of eligible acidic developer materials also include other clays, such as treated clays (U.S. Pat. Nos. 3,622,364 and 3,753,761); aromatic carboxylic acids such as salicylic acid; derivatives of aromatic carboxylic acids and metal salts thereof (U.S. Pat. No. 4,022,936); phenolic developers (U.S. Pat. Nos. 3,244,550 and 4,573,063); acidic polymeric material such as phenol-formaldehyde polymers, etc. (U.S. Pat. Nos. 3,455,721 and 3,672,935); and metal-modified phenolic resins (U.S. Pat. Nos. 3,732,120; 3,737,410; 4,165,102; 4,165,103; 4,166,644 and 4,188,456). Image enhancement by inclusion of metallic salts of carboxylic acids, such as use of zinc salicylate, can be optionally employed.

Types of Solvents

Many different types of solvents are used in ink manufacture. The volatile solvents can be classified in terms of their solubility properties, which depend on the chemical group to which they belong. Typical volatile solvents suitable for use in typical CF lithographic inks which can be used as the color former in this invention, in a CF-CB reaction, are as follows.
Alcohols
Esters
Aliphatics
Glycols
Ketones
Aromatics The Resins In general, the resin is a carrier for the coreactant material and for the chromogenic material when the chromogenic material is released into the ink composition. Typical types of synthetic resins are as follows.

Polyvinyl acetates
Acrylics
Ethyl celluloses
Cellulose nitrates
Ketones
Polystyrenes
Polyvinyl butyrals
Alkyds
Phenolics
Chlorinated rubbers
Cyclic rubbers
Polyurethanes
Polyvinyl alcohols
Epoxides
Polyamides
Ethyl hydroxy ethyl celluloses (EHEC)
Cellulose acetate butyrals (CAB)
Cellulose acetate propionates (CAP)
Sodium carboxy methyl celluloses (CMC)

Many such resins are available in a variety of different grades, each possessing different properties in terms of solubility, hardness, resistance, and adhesion. Those skilled in the art will accordingly select suitable resins for their particular embodiments, as well as selecting suitable processing and property compatibilizers in order to provide desired properties in the finished color developer ink coating.

Given the lacquer finish typically used on e.g. a compact disc, and given the plastic material typically used for jewel case cover 16, the compositions of both coatings 20, 24 are selected for suitably drying, and for finished dry surface characteristics, so as to be compatible with the use intended. The coating on jewel case cover 16 can be coated onto a substrate, with the substrate being e.g. adhesively mounted to cover 16. In the alternative, the coating can be coated directly onto cover 16. In either case, the coating can be removably mounted to the cover by e.g. peelable adhesive material, if desired.

The composition of a given coating, whether the chromogenic coating or the developer coating, is selected both for its color development chemical properties as well as for its physical properties relating to securement to the substrate to which the coating is applied as well as to drying properties and finished surface tack properties which develop when the coating is fully dried. Thus, a given coating 20, 24 to be applied to e.g. a paper substrate at a sheet 18 is formulated with different e.g. polymer materials and/or different solvents than a similar coating which is to be applied to a polymeric substrate.

Turning now to the compact disc, the coating thereon, e.g. coating 20, is preferably coated directly onto the outer e.g. lacquer surface of the compact disc. Accordingly, an ink composition suitable for application to a lacquer substrate is selected.

Coating 20 on the compact disc is optionally but preferably symmetric with respect to a central axis of rotation "A" which extends perpendicular to the plane of outer surface 22 of the disc. With such proper balance, the coating does not interfere with the natural balance of the disc while the disc is in use in e.g. a compact disc reader, recorder, or duplicator.

The plan view image, shape and orientation of coating 20 on disc 22 can take a variety of shapes, and can represent any desired plan view shape. As shown in FIG. 1, coating 20 is in the shape of an annulus, or ring, disposed on one of the two opposing main surfaces of the disc, and is disposed inwardly of the innermost portions of the disc on which data is stored. Coating 20 can optionally be a single or multiple spots of any given shape.

In the alternative, and also as illustrated in FIG. 1, the coating on the disc can be represented by multiple coating elements. FIG. 1 shows two elements 20A representing the stylized letter "M" on opposing sides of, and symmetric with respect to, axis "A". Alphanumeric indicia such as the stylized letter "M" are preferred.

In the multiple coating elements embodiment illustrated, the respective coating elements 20A overlie data storage sites on the disc without interfering with recording, storage, or retrieval of such data. More than two coating elements 20A can be used.

However many coating elements are used, e.g. 1, 2, 3, 4 or any other desired number, typically coating 20 or 20A on the compact disc or other recording medium collectively covers all or a portion of the projected surface area of outer surface 22 of the disc. In a preferred embodiment typically coating 20 or 20A is no more than about 20% of the projected surface area of outer surface 22 of the disc. Thus, the single 20 or multiple 20A elements of coating represent discrete, separate coating elements, in part, and in combination with the typical overcoat of lacquer on a compact disc, forming the outer surface of the disc when the coating elements are in place.

Wherever the discrete coating elements 20 or 20A are positioned on disc 10, a corresponding counterpart coating element 24, 24A can be disposed on inner surface 26 of cover 16 of the jewel case at locations which overlie one or more of such discrete coating elements 20, 20A when the package is closed, so that pressure of e.g. manual squeezing, or the force of a user's hand, on the outer surface of the jewel case cover, when the cover is closed over the disc, is effective to bring pressure on the microcapsules in coating 24, 24A against coating 20, 20A, thus to break microcapsules and expose the desired image at the respective coating 20 or coating element 20A.

Listed following are typical examples of ink compositions useful as the color former coating 20.

TABLE 2

GENERAL EMBODIMENT FOR LITHOGRAPHIC CF INK
Using Reactive Clay

| Material | Amount | Manufacturer | City | State |
|---|---|---|---|---|
| Fulacolor Clay Ink base F10,000 Soyforms | 22% | Rockwood | Austin | TX |
| Transparent White | 78% | Kohl & Madden | Fort Lee | NJ |
| Total | 100% | | | |

TABLE 3

FIRST SPECIFIC EMBODIMENT FOR LITHOGRAPHIC CF INK
Using Reactive Clay

| Material | Amount | Manufacturer | City | State |
|---|---|---|---|---|
| Ink Oil #538 | 18% | Exxon | Houston | TX |
| Alfol 14 Alcohol | 15% | Sasol | Houston | TX |
| Bentone SD-1 bentonite | 1% | Quartz | Berwyn | PA |
| Fulacolor Clay | 38% | Rockwood | Austin | TX |
| Polyamide Resin | 21% | Lawter International | Pleasant Prairie | WI |
| Aerosil Pigment | 7% | Degussa | Parsippany | NJ |
| Total | 100% | | | |

TABLE 4

SECOND SPECIFIC EMBODIMENT FOR LITHOGRAPHIC CF INK
Using Reactive Resin

| Material | Amount | Manufacturer | City | State |
|---|---|---|---|---|
| Ink Oil #538 | 16% | Exxon | Houston | TX |
| Alfol 14 Alcohol | 15% | Sasol | Houston | TX |
| Bentone SD-1 bentonite | 1% | Quartz | Berwyn | PA |
| Resin 32420 | 38% | Durez | Dallas | TX |
| Ansilex Clay | 23% | Englehard | Iselin | NJ |
| Aerosil Pigment | 7% | Degussa | Parsippany | NJ |
| Total | 100% | | | |

TABLE 5

TYPICAL ULTRAVIOLET-CURABLE CF INK

| | Typical Amount | Range |
|---|---|---|
| Coreactant | 25% | 9% to 40% |
| Prepolymers | 35% | 9% to 50% |
| Monomers-Oligomers | 25% | 9% to 40% |
| Photoinitiators | 10% | 4% to 15% |
| Additives | 5% | 1% to 10% |
| Total | 100% | |

Coreactants for Ultraviolet-Curable inks are the same as the coreactants listed above for reaction with the respective chromogenic materials. In general, any of the listed coreactants can be used with any of the chromogenic materials.

Exemplary prepolymers, without limitation, which are suitable for use in ultraviolet-curable inks useful in the invention are as follows.

Epoxy Acrylates

Polyurethane Acrylates

Polyester Acrylates

Urethanes

Epoxides

Polyesters

Exemplary of monomers and oligomers which are suitable for use in the ultraviolet curable inks employed in the invention are as follows.

Polyethylene Glycol Diacrylates

Tripropylene Glycol Diacrylates (TGD)

Phenoxy Ethyl Acrylates

Isodecryl Acrylates

Exemplary of photoinitiators which are suitable for use in the ultraviolet curable inks employed in the invention are as follows Benzophenone Triethanolamine Chlorothioxanone A generic expression of preferred embodiments of compositions of ultraviolet-curable CF inks for use in the invention is as follows.

TABLE 6

GENERIC STATEMENT OF PREFERRED
ULTRAVIOLET-CURABLE CF INK

| Material | Amount | Manufacturer | City | State |
|---|---|---|---|---|
| Fulacolor Clay | 28% | Rockwood | Austin | TX |
| UVI Web Transparent White Ink base | 72% | Ron Ink | Rochester | NY |
| Total | 100% | | | |

Referring to Table 5, and drawing from the materials lists presented subsequent to Table 5, a general illustration of UV curable ink compositions suitable for use in the invention is as follows.

TABLE 7

GENERAL ILLUSTRATION OF ULTRAVIOLET-CURABLE CF INK

| Material | Amount |
|---|---|
| Coreactant | |
| Fulacolor Clay Ink Base Prepolymers | 28% |
| Epoxy Acrylate | 25% |
| Polyester Acrylate Monomers-Oligomers | 5% |
| Tripropylene Glycol Diacrylates Photoinitiators | 27% |
| Chlorothioxanone | 4% |
| Benzophenone Additives | 5% |
| Surfactant | 3% |
| Amine | 3% |
| Total | 100% |

As indicated above, coating 24 on the packaging material can include a suitable substrate if desired, and can be located on any of the materials included as part of the packaging with which the compact disc is distributed.

As illustrated in FIG. 1, CB layer 24 can be used to activate CF layer 20 on the compact disc without removing the CB layer 24 from the cover. In some embodiments, the clearance between the compact disc and the jewel case cover is sufficiently small, and the cover is sufficiently deflectable, that manual pressure of e.g. an adult user on the jewel case cover above the layer 24 CB coating can bring sufficient pressure to bear on CF layer 20 to break enough capsules in layer 24 to provide the desired authenticating image.

Where the clearance between layers 20 and 24 is so great as to make such in-place activation impractical, or where e.g. sheet materials 18 are disposed between layers 20 and 24, or simply at the desire of the user, the compact disc can be removed from the receptacle of the jewel case and brought into contact, with pressure, with the inner surface of the jewel case, with layers 20 and 24 in pressured interfacial contact so as to break the capsules and thereby develop the desired image.

In another embodiment, layer 24 can be attached to inner surface 26 of the jewel case, or to e.g. one of sheets 18, by peelable adhesive and is thus releasably attached to the inner surface of cover 16. In such embodiments, layer 24 is peeled from the respective packaging material substrate and is brought into face-to-face contact with layer 20, with pressure, thereby to break microcapsules and accordingly activate the desired image whereafter layer 24 is removed from disc 10, and disc 10 is used in the usual manner.

In the alternative, e.g. a packaging sheet 18 bearing coating 24 can be packaged with jewel case 14 as a sheet or can be releasably attached to disc 10 or to jewel case 14 by e.g. peelable adhesive or as a tear off stub with perforated tear line or the like. When authentication of the product is desired, such sheet 18 is peeled or otherwise obtained from disc 10 or jewel case 14, placed over coating 20 with coating 24 in surface-to-surface contact with coating 20. Pressure is then applied to thereby break ones of the microcapsules and develop a latent color image at coating 20.

In general, a separate coating 24 is not left in contact with coating 20 except for the purpose of developing the image.

In yet another embodiment, the microcapsules containing the chromogenic material and the color former e.g. ink coating 20, are both coated onto the surface of the compact disc in a self-contained coating composition. Such self-contained coating composition can be homogeneous with respect to thickness thereof. In the alternative, such self-contained coating can be heterogeneous whereby e.g. the color developer is first coated onto outer surface 22 followed by application of a coating of the microcapsule-containing material onto the color developer layer, or vice versa. In either event, the desired image can be formed in situ by bringing pressure such as typical writing pressure to bear on the self-contained coating. Such self-contained coating, whether heterogeneous or homogeneous, is typically left on disc 10 while the disc is used in the usual manner for data recording, storage, or retrieval.

In some embodiments, adhesive is used in one or both of coatings 20 and 24 to bond the coatings to each other, or in a self-contained layer; and the chromogenic material color is activated by breaking the microcapsules under tension by pulling layers 20 and 24 away from each other or by otherwise breaking the self-contained layer. Thus, the microcapsules can be ruptured by either pressure or tension in the respective layer which contains the microcapsules.

The above structures and locations attribute the developer ink to coating 20 on disc 10 and the microcapsules chromogenic coating to coating 24 on the packaging. Where desired, the compositions can be reversed such that the microcapsule chromogenic coating is on the disc and the developer ink coating is on the packaging material. The color will then develop as an image on the respective coated packaging material. In such case, the user can authenticate the product by developing the color image on the packaging material, and can submit such authentication, along with serial number of like information, as part of the warranty validation package, to the manufacturer of the good. The manufacturer can then validate the authentication by comparing the color of the image submitted against a color standard. Where the manufacturer controls availability of the supply of the chromogenic materials of the color standard, authenticity is assured.

While the invention has been described herein with respect to a compact disc as an exemplary primary data storage device for storing and retrieving electronic data, the invention can apply as well to the wide range of devices which are known for use in storing and/or retrieving electronic data. Thus, there can be mentioned such additional data storage devices as DVD's and MP3 devices, as well as others, present and future, which provide suitable surface to which to secure a chromogenically-reactable coating.

Regarding any of the above structures and compositions for use as or on coatings 20, 20A, 24, 24A, one can use a variety of methods for applying such discrete coatings in desired coating patterns. There can be mentioned, for example, flexographic printing, lithographic printing, offset printing, and the like. A preferred application method is screen printing.

As used herein, "readily ruptured microcapsules" means that the microcapsules can be ruptured by typical use of conventional writing instruments and the like.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

What is claimed is:

1. A closed product package, comprising:
   (a) as a contained product, a primary electronic data storage-device adapted to receive and store data in electronic format;
   (b) packaging material comprising enclosure structure generally enclosing said data storage device; and
   (c) an authentication system adapted to affirm authenticity of source of said data storage device, said authentication system comprising
      (i) a first coating, comprising a color developer material, coated on a first one of an outer surface of said primary data storage device, and a surface of said packaging material, said color forming material being contained in a population of microcapsules, and
      (ii) a second coating, comprising a color developer material, coated on the other of the outer surface of said primary data storage device and the surface of said packaging material,
   said first and second coatings, in the closed package, being in face-to-face close association with each other, or in contact with each other, such that manipulation of the packaging material relative to the contained product releases the color forming material from the microcapsules whereby the color forming material is contacted by, and reacts with, the color developer material, to produce visible color.

2. A product package as in claim 1 wherein said first coating comprises said color developer and said second coating comprises said microcapsules containing said color former.

3. A product package as in claim 1 wherein said second coating comprises said color developer and said first coating comprises said microcapsules containing said color former.

4. A product package as in claim 1, said packaging material comprising a sheet material separate and distinct from both said enclosure structure and said data storage device and enclosed in said product package with said data storage device, said first coating being coated onto said sheet material.

5. A product package as in claim 4, said sheet material being releasably attached to said data storage device.

6. A product package as in claim 4, said sheet material being attached to said enclosure structure.

7. A product package as in claim 1 wherein said first coating defines at least one of alphanumeric indicia, graphics, and logos.

8. A product package, comprising:
   (a) as a contained product, a primary data storage device capable of receiving and storing data in electronic format;
   (b) packaging material comprising enclosure structure generally enclosing said data storage device; and
   (c) an authentication system for affirming authenticity of source of said data storage device, said authentication system comprising
      (i) a first coating coated on a first one of an outer surface of said primary data storage device, and a surface of said packaging material, and
      (ii) a second coating coated on the other of the outer surface of said primary data storage device and the surface of said packaging material, and
   one of said first and second coatings comprising a population of microcapsules containing substantially colorless color forming material capable of reacting to produce visible color, the other of said first and second coatings comprising color developer material which can chemically react with said color forming material to produce visible color
   wherein said first coating is coated onto said enclosure structure and said second coating is coated onto said primary data storage device, and wherein said first and second coatings are bonded to each other in the closed package such that such bond therebetween is broken when said package is opened, with corresponding breaking of ones of said microcapsules and reaction of said color forming material to form color.

9. A product package as in claim 1 wherein said first coating is symmetric with respect to a central axis of said primary data storage device.

10. A product package as in claim 1 wherein said first coating comprises at least a first coating element and a second coating element, said first and second coating elements being physically spaced from each other, and wherein said first coating element and said second coating element, in combination, are symmetric with respect to each other when referenced to a central axis of rotation of the primary data storage device.

11. A product package as in claim 1 wherein the first outer surface of said primary data storage device defines an outer edge-to-outer edge projected area of said primary data storage device, and wherein said first coating is disposed inwardly toward a center of such projected area with respect to any portion of said primary data storage device on which data is stored.

12. A product package, comprising:
   (a) as a contained product, a primary data storage device capable of receiving and storing data in electronic format;
   (b) packaging material comprising enclosure structure generally enclosing said data storage device; and
   (c) an authentication system for affirming authenticity of source of said data storage device, said authentication system comprising
      (i) a first coating coated on a first one of an outer surface of said primary data storage device, and a surface of said packaging material, and
      (ii) a second coating coated on the other of the outer surface of said primary data storage device and the surface of said packaging material, and
   one of said first and second coatings comprising a population of microcapsules containing substantially colorless color forming material capable of reacting to produce visible color, the other of said first and second coatings comprising color developer material which can chemically react with said color forming material to produce visible color wherein said second coating is disposed on a cover of said enclosure structure which is in face-to-face close association with the first outer surface of said primary data storage device when said package is closed with said primary data storage device inside, and wherein said second coating is positioned on an inner surface of said cover so as to overlie said first coating on said primary data storage device when said package is closed, whereby pressure on an outer surface of said cover causes said cover to deflect so as to bring said second coating into engaging contact with said first coating sufficient to break said microcapsules and produce visible color.

13. A method of affirming authenticity of a primary electronic data storage device, comprising:
 (a) applying to an outer surface of the primary data storage device a coating comprising a first chemical composition which can be reacted with a second different chemical composition to produce a color;
 (b) packaging the primary data storage device, bearing the coating composition, and a second such different chemical composition which is reactable with the first chemical composition to produce a visible color, in packaging material so as to provide a closed and sealed package containing the primary data storage device, and containing both the first chemical composition and the second chemical composition in face-to-face close association with each other, or in contact with each other; and
 (c) subsequent to packaging the primary data storage device, opening the package and thereby manipulating the packaging material relative to the contained product thereby to cause mixing of the first and second chemical compositions, and corresponding production of color as an indication of authenticity of the data storage device.

14. A method as in claim 13 wherein the coating on the outer surface of the primary data storage device comprises a first coating comprising microcapsules collectively containing at least one of chromogenic material capable of reacting to produce a color as the first chemical composition, or color developer as the second composition, the method further comprising:
 (e) as part of the packaging material, providing a coated sheet in the closed and sealed package, the coated sheet comprising a substrate, and a second coating thereon as the second different chemical composition, the second different chemical composition comprising the other of the chromogenic material and the color developer reactive with the chromogenic material in the first coating.

15. A method as in claim further comprising returning the coated sheet, with the color developed thereon, to an authorized authentication facility for authentication of the primary data storage device in accord with the color so developed.

16. A method as in claim 14, further comprising authenticating the primary data storage device through comparison of the developed color on the coated sheet with a color standard.

17. A method as in claim 13 wherein the coating on the outer surface of the primary data storage device comprises a first coating comprising (i) as a first component, microcapsules containing at least one of chromogenic material capable of reacting to produce a color as the first chemical composition, or color developer as the second composition and (ii) as a second component, the other of the chromogenic material and the color developer, the method further comprising:
 (e) subsequent to providing the closed and sealed package, breaking ones of the microcapsules so as to commingle the first and second chemical compositions and thereby produce the color indication.

18. A method of affirming authenticity of a primary electronic data storage device, comprising:
 (a) applying to an outer surface of the primary electronic data storage device a first coating comprising one of (i) a first color forming material which can be reacted with a second different color developer material to produce a color and (ii) the second color developer material; and
 (b) applying the other of the first and second materials as a second coating, to a surface of a packaging material, one of the first and second coatings comprising a population of microcapsules containing the first color forming material;
 (c) packaging the primary data storage device in a closed package having a seal thereon, and comprising the packaging material; and
 (d) subsequent to packaging the primary data storage device, manipulating the packaging material relative to the contained product and thereby activating the color forming material into contact with the color developer, thereby to produce the color as an indication of authenticity of the data storage device.

19. A method as in claim 18 wherein the coating on the outer surface of the primary data storage device comprises the first coating, which comprises microcapsules containing the first color forming material the method further comprising:
 (e) as part of the packaging material, providing a coated sheet in the closed and sealed package, the coated sheet comprising a substrate, and a second coating thereon as the second color developer material; and
 (f) bringing the first and second materials into activating contact with each other thereby to activate a reaction between the first and second materials and accordingly to develop the color on the coated sheet.

20. A method as in claim 19, further comprising returning the coated sheet, with the color developed thereon, to an authorized authentication facility for authentication of the primary data storage device in accord with the color so developed.

21. A method as in claim 19, further comprising authenticating the primary data storage device through comparison of the developed color on the coated sheet with a color standard.

* * * * *